US010893243B1

(12) United States Patent
Trundle

(10) Patent No.: US 10,893,243 B1
(45) Date of Patent: Jan. 12, 2021

(54) LAWN VIOLATION DETECTION

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 25 days.

(21) Appl. No.: 16/295,970

(22) Filed: Mar. 7, 2019

Related U.S. Application Data

(60) Provisional application No. 62/639,778, filed on Mar. 7, 2018.

(51) Int. Cl.
H04N 7/18 (2006.01)
G06K 9/00 (2006.01)
G06F 9/54 (2006.01)
H04N 5/232 (2006.01)

(52) U.S. Cl.
CPC ............ H04N 7/185 (2013.01); G06F 9/542 (2013.01); G06K 9/00335 (2013.01); G06K 9/00771 (2013.01); H04N 5/23206 (2013.01)

(58) Field of Classification Search
CPC .... H04N 7/185; H04N 5/23206; G06F 9/542; G06K 9/00335; G06K 9/00771; G08B 13/19602
USPC ....................................................... 348/143
See application file for complete search history.

(56) References Cited

U.S. PATENT DOCUMENTS

| 4,552,307 | A | 11/1985 | Stedham | |
|---|---|---|---|---|
| 6,675,386 | B1* | 1/2004 | Hendricks | .......... H04N 7/17318 348/143 |
| 8,565,228 | B1* | 10/2013 | Howard | ................ H04L 12/283 370/389 |
| 8,908,034 | B2* | 12/2014 | Bordonaro | ....... G08B 13/19682 348/143 |
| 2004/0161133 | A1* | 8/2004 | Elazar | ................ G06K 9/00771 382/115 |
| 2007/0083915 | A1* | 4/2007 | Janakiraman | ....... G06F 21/6218 726/4 |
| 2009/0022362 | A1* | 1/2009 | Gagvani | ............ G06K 9/00718 382/100 |
| 2013/0034266 | A1* | 2/2013 | Shamir | ................... G06T 7/292 382/103 |

(Continued)

FOREIGN PATENT DOCUMENTS

CN    107749969 A  *  3/2018  ............... H04N 7/18

Primary Examiner — Christopher S Kelley
Assistant Examiner — Asmamaw G Tarko
(74) Attorney, Agent, or Firm — Fish & Richardson P.C.

(57) ABSTRACT

A computer implemented method including receiving, by a monitoring system that is configured to monitor a property, and from a camera, first image data, based on the first image data, determining, by the monitoring system that an animal is located at the property, and that a human is within a threshold distance of the animal, based on determining that the animal is located at the property and that a human is within the threshold distance of the animal, determining, by the monitoring system, that the animal likely discharged feces on the property and that the human did not remove the feces from the property, and based on determining that the animal likely discharged feces on the property and that the human did not remove the feces from the property, performing a monitoring system action.

19 Claims, 4 Drawing Sheets

(56) References Cited

U.S. PATENT DOCUMENTS

| | | | | |
|---|---|---|---|---|
| 2015/0128878 A1* | 5/2015 | Van Curen | ......... | G06K 9/00671 |
| | | | | 119/721 |
| 2017/0215385 A1* | 8/2017 | Hansen | ................ | A01K 27/002 |
| 2018/0049426 A1 | 2/2018 | Francis | | |
| 2018/0077919 A1* | 3/2018 | McNew | .................. | E05F 15/77 |
| 2019/0174723 A1* | 6/2019 | Umeg Rd | ............ | A01K 11/008 |

* cited by examiner

LAWN VIOLATION DETECTION

CROSS REFERENCE TO RELATED APPLICATION

This application claims benefit of U.S. Provisional Application No. 62/639,778 filed Mar. 7, 2018, which is incorporated by reference in its entirety.

TECHNICAL FIELD

This disclosure relates to property monitoring technology and, for example, utilizing video analytics to monitor the lawn of a property for various possible violations to the lawn of the property.

BACKGROUND

Many people equip homes and businesses with monitoring systems to provide increased security for their homes and businesses.

SUMMARY

Techniques are described for monitoring technology. For example, techniques are described for integrating a monitoring system with one or more cameras to monitor the lawn area surrounding a property for lawn violation events. Each of the one or more cameras are positioned to monitor the lawn area surrounding the property. The one or more cameras may utilize video analytics combined with PIR technology to detect lawn violations, such as, for example, uncollected dog droppings.

According to an innovative aspect of the subject matter described in this application, a monitoring system that is configured to monitor a property, the monitoring system includes a camera that is configured to capture image data, and a monitor control unit that is configured to receive, from the camera, image data, based on the image data, determine that an animal is located at the property, and that a human is within a threshold distance of the animal, based on determining that the animal is located at the property and that a human is within the threshold distance of the animal and based on the image data, determine that the animal likely discharged feces on the property and that the human did not likely remove the feces from the property, and based on determining that the animal likely discharged feces on the property and that the human did not likely remove the feces from the property, perform a monitoring system action.

These and other implementations each optionally include one or more of the following optional features. The camera includes the monitor control unit. The camera is remote to the monitor control unit. The monitor control unit is configured to perform a monitoring action by sounding an audible alarm, sounding an alarm audible to the animal, or activating a sprinkler at the property. The monitor control unit is configured to perform a monitoring action by outputting a voice command from a speaker instructing the human to collect the feces.

The monitor control unit is configured to receive, from the camera, additional image data, based on the additional image data, determine that an additional animal is located at the property, and that an additional human is not within the threshold distance of the additional animal, based on determining that the additional animal is located at the property and that the additional human is not within the threshold distance of the additional animal and based on the additional image data, determine that additional animal likely discharged feces on the property, compare the additional image data to a stored image of a pet that lives at the property, based on comparing the additional image to the stored image of the pet that lives at the property, determine that the additional animal is the pet that lives at the property, and based on determining that the additional animal is the pet that lives at the property and based on determining that the additional animal likely discharged feces on the property, communicate a notification to a user device of a resident of the property.

The monitor control unit is configured to compare the image data to stored images of animals that have previously discharged, on the property, feces that was not removed, based on comparing the image data to the stored images of animals that have discharged, on the property, feces that was not removed, determine that the animal has not previously discharged, on the property, feces that was not removed, and based on determining that the animal has not previously discharged, on the property, feces that was not removed, store the image data as an image associated with the animal and data indicating that the animal has discharged, on the property, feces that was not removed.

The monitor control unit is configured to receive, from a server, images of animals that have previously discharged, on properties in a vicinity of the property, feces that was not removed, comparing the image data to the images of animals that have previously discharged, on properties in the vicinity of the property, feces that was not removed, based on comparing the image data to the images of animals that have previously discharged, on the properties in the vicinity of the property, feces that was not removed, determine that the animal has not previously discharged, on the properties in the vicinity of the property, feces that was not removed, and based on determining that the animal has not previously discharged, on the properties in the vicinity of the property, feces that was not removed, provide, to the server, the image data as an image associated with the animal and data indicating that the animal has discharged, on the property, feces that was not removed.

The monitor control unit is configured to receive, from the camera, additional image data, based on the additional image data, determine that an additional animal is located at the property, compare additional image data to locally or remotely stored images of animals that have previously discharged, on the property or a nearby property, feces that was not removed, based on comparing the additional image data to the locally or remotely stored images of animals that have previously discharged, on the property or the nearby property, feces that was not removed, determine that the additional animal has previously discharged, on the property or the nearby property, feces that was not removed, and based on determining that the additional animal has previously discharged, on the property or the nearby property, feces that was not removed, switch on one or more lawn sprinklers in a vicinity of the additional animal.

The monitor control unit is further configured to receive, from the camera, additional image data, based on the additional image data, determine that an additional animal is located at the property, and that an additional human is within a threshold distance of the additional animal, compare the additional image data to stored images of humans who have not removed, from the property, feces discharged by an animal accompanying a respective human, based on comparing the additional image data to the stored images of humans who have not removed, from the property, feces discharged by an animal accompanying the respective human, determine that the additional human is a human who has not removed, from the property, feces discharged by an animal accompanying the human, and based on determining that the additional human is a human who has not removed, from the property, feces discharged by an animal accompanying the human, communicate a notification to a user device of a resident of the property.

The notification to the user device of the resident of the property includes an image of the human and the animal. The monitor control unit is configured to determine that the animal likely discharged feces on the property and that the human did not remove the feces from the property by, determining a first confidence score that reflects a likelihood that a base of a tail of the animal is lower than a nose of the animal, comparing the first confidence score to a first confidence score threshold, based on determining that the first confidence score satisfies the first confidence score threshold, determining that the animal likely discharged feces on the property, determining a second confidence score that reflects a likelihood that the human bends over, comparing the second confidence score to a second confidence score threshold, and based on determining that the second confidence score satisfies the second confidence threshold, determining that the human did not likely remove the feces from the property.

The monitor control unit is configured to receive, from the camera, additional image data, based on the image data, determine that an additional animal is located at the property, based on determining that the additional animal is located at the property and based on the additional image data, determine that the additional animal likely discharged urine on the property, and based on determining that the additional animal likely discharged urine on the property, activate a sprinkler in a vicinity of the additional animal. The monitor control unit is configured to based on the additional image data, determine an elapsed time that the additional animal likely discharged urine on the property, based on the elapsed time that the additional animal likely discharged urine on the property, determine a period of time for the sprinkler to activate to dilute the urine below a threshold concentration, and activate a sprinkler in a vicinity of the additional animal by activating the sprinkler for the period of time.

According to another innovative aspect of the subject matter described in this application, a computer implemented method, includes receiving, by a monitoring system that is configured to monitor a property and from a camera, image data, based on the image data, determining, by the monitoring system, that an animal is located at the property, and that a human is within a threshold distance of the animal, based on determining that the animal is located at the property and that a human is within the threshold distance of the animal and based on the image data, determining, by the monitoring system, that the animal likely discharged feces on the property and that the human did not remove the feces from the property, and based on determining that the animal likely discharged feces on the property and that the human did not remove the feces from the property, performing, by the monitoring system, a monitoring system action.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating a monitoring system with one or more cameras to monitor the lawn area of a property. The one or more cameras may each be positioned to monitor the lawn area. For example, the one or more cameras may be positioned on a lower portion of the exterior wall of the monitored property. Each of the one or more cameras includes a Passive Infrared Sensor (PIR) that is configured to detect heat radiated from living objects, and with a low power light sensitive sensor that is configured to detect movement of a living organism within the field of view of the sensor and camera lens. When the low power light sensor or the PIR sensor of at least one of the cameras detects movement within the camera's field of view, the camera initiates the capture of video data. The captured video data is communicated to a control unit within the monitoring system, and the control unit performs a variety of video analytics techniques to analyze the received video to detect possible lawn violations. For example, the video analytics may be used to detect when an animal approaches the property and defecates on the lawn of the property. The video analytics may further be used to detect a human associated with the dog, (e.g., owner or dog walker), and to confirm whether the human associated with the dog collects the dog droppings or not. Based on the data received by the control unit, the control unit may communicate with one or more electronic devices within the monitoring system, and may prompt the electronic devices to perform one or more actions in response to the detected event. For example, the control unit may turn on the water sprinkler on the lawn based on detecting an animal on the lawn of the property.

Figure 1:
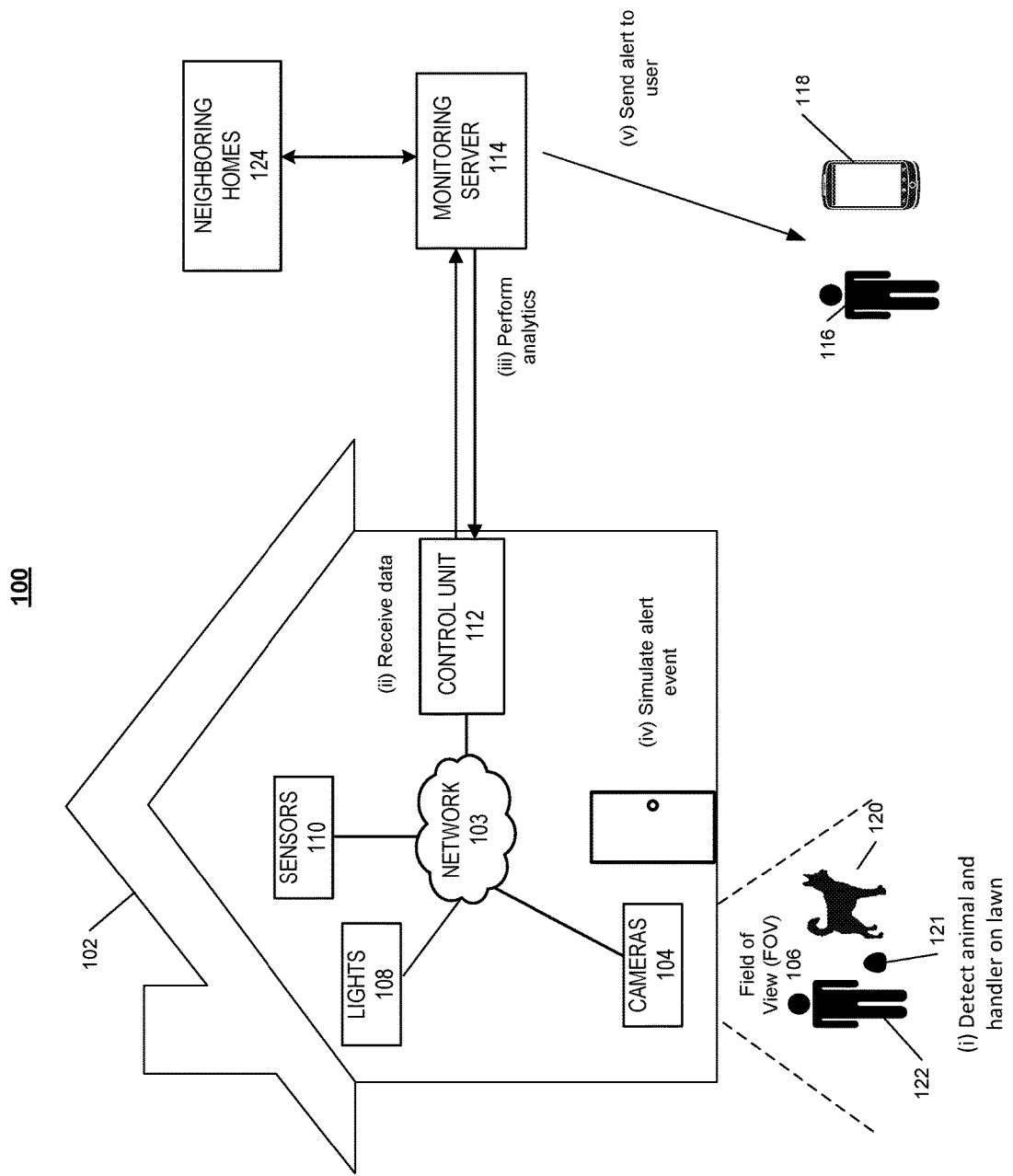
FIG. 1 illustrates an example of a system for utilizing video analytics and sensor technology to detect lawn violations at a monitored property.

FIG. 1 illustrates an example of a monitoring system 100 integrated with one or more cameras 104. As shown in FIG. 1, a property 102 (e.g., a home) of a user 116 is monitored by an in-home monitoring system (e.g., in-home security system) that includes components that are fixed within the property 102. The in-home monitoring system may include a control unit 112, one or more sensors 110, one or more lights 108, and one or more cameras 104. The user 116 may integrate the one or more cameras 104 into the in-home monitoring system to monitor for any lawn violation events, such as, for example, animal defection, loitering on lawn, theft of garden items, or any other unwarranted event. The one or more cameras 104 may be located throughout the monitored property 102. For example, the one or more cameras 104 may be located at the front door, the back door, and on either side of the monitored property 102. The one or more cameras 104 may be configured so that each square inch of the lawn is within the field of view of at least one of the one or more cameras 104. In some examples, each of the one or more cameras 104 may be pan/tilt cameras that are configured to pan or tilt to change the field of view of the camera.

In the example shown in FIG. 1, an animal 120 and a human handler 122 (e.g., an owner or a dog walker) may approach the monitored property 102. When either the human handler 122 or the animal 120 is within the field of view (FOV) 106 of at least one of the one or more cameras 104, the passive infrared sensor (PIR) sensor within the camera detects the heat radiated off each of them. Each of the one or more cameras 104 may include a low power light sensitive sensor that can distinguish between a human and an animal. The low power light sensor may be configured to collimate light such that an adequate number of regions of the FOV are collimated onto a sufficient number of regions on the sensor, and may be configured to assess the amount of light striking the different regions of the sensor. In visual conditions other than total darkness, objects moving within the field of view 106 of one of the cameras 104 may cause changes in the amount of light reaching the light sensitive sensor. Based on the variations in the light intensity, the camera may determine when an object is moving. The control unit may be configured to receive data from the one or more cameras 106 to determine the shape of the detected object, and may determine whether the object is a human or animal based on the determined shape.

When the presence of either the animal 120 or the human handler 122 is detected within the FOV 106 of one of the cameras 104, the camera initiates the capture of video data. In some examples, the camera that detects the handler 122 or the animal 120 initiates the capture of video data. In some examples, where one camera detects the handler 122, and a second camera detects the animal 120, both of the cameras begin to capture video data. In other examples, both the camera(s) that detect movement, and one or more other cameras around the property begin to capture video data. The one or more cameras 104 may also capture still images of the animal 120 and the human 122.

The video data collected by the one or more cameras 104 is communicated to the control unit 112. The control unit 112 may be configured to interpret the video data to identify actions that the user 116 would like to have identified as lawn violations. In some implementations, the video data received by the control unit 112 is communicated to the monitoring server 114. The monitoring server 114 may be a server that is located remotely from the monitored property 102, and may be configured to interpret the video data received from the control unit 112 at the property 102. The monitoring server 114 may be in communication with one or more control units from one or more properties that are monitored by an in-home monitoring system.

The monitoring server 114 may implement the use of one or more algorithms and neural networking to make determinations of actions from the collected video data. The monitoring server 114 may utilize training sets of data to improve the algorithms used to detect actions from the video data received from the control unit 112. The monitoring server 114 may be trained by the user 116 to detect the actions identified by the user 116 as lawn violations. The user 116 may set the system to a training mode and provide confirmation of an action. For example, while the system is in training mode the user may provide true or false responses based on reviewing video data of different actions in the video data. The user may review the video data and the determination made by the monitoring server 114 to respond whether the determination was true or false. Receiving user feedback while in training mode helps the monitoring server to improve the algorithms used to make the determinations. In some implementations, the one or more cameras 104 perform the video analytics. In other implementations, the one or more cameras 104 communicate the video data to the control unit, and the control unit performs the video analytics. In yet another implementation, the control unit communicates the video data to the monitoring server, and the monitoring server performs the video analytics.

The user 116 may log into a monitoring application that runs on the user device 118 to set the one or more actions that should be considered lawn violations, and may also set the appropriate action that should be taken in response to the set action. For example, the user 116 may set dog defecation without pick up by a human handler as a lawn violation action, and may set the action to be taken as generating a voice command to the handler to collect the dog droppings. The user 116 may also set the presence of an animal as a lawn violation action, and may set the action to be taken as turning on the water sprinklers. In some examples, the user may set the action to be taken as turning on one or more lights around the property, or emitting a silent whistle that bothers animals. The user may set the presence of a human as a lawn violation action, and may set the action to be taken as turning on an external light. The user 116 may continuously personalize the list of lawn violation actions by adding or removing actions from the set preferences through the monitoring application on the user device 118.

For the example illustrated in FIG. 1, where the user 116 has set the action of an animal defecating on the lawn of the monitoring property, without the handler collecting the animal droppings, as a lawn violation action, the one or more cameras 104 that detect the presence of the animal 120 and the human handler 122 communicate the video data to the control unit 112. In some implementations, the one or more cameras perform the video analytics on video data, in other implementations, the video data is communicated to the control unit 12 and in turn communicated to the monitoring server 114. The video data may be analyzed based on one or more criteria, including determining whether there is an animal in the area, and whether there is a human within a threshold distance to the animal. For example, the human 122 is determined to have a relation to the animal 122 since the animal is within twenty feet of the human 122.

Next, it is determined whether there is a physical connection between the animal 120 and the human 122. The video analytics then determines whether the animal 120 has paused in one spot for a period of time. The light sensitive sensor within the camera may determine whether the size of the animal object remains the same for a period of time indicating that the animal 120 has paused. Other criteria of the video data may be interpreted to determine whether the animal defecated on the lawn of the property, without the handler 122 collecting the droppings. These may include: determining whether the nose of the animal is lower than the base of the animal tail, indicating that the animal is not defecating; determining whether the base of the tail of the animal is lower than the nose, indicating that the animal may be sitting or defecating; determining whether the angle of the slope of the tail of the animal is positive, negative, or neutral. A positive or neutral slope of the tail may more strongly indicate that the animal is defecating; determining whether the human pauses simultaneously with the animal. The human simultaneously pausing with the animal indicates a higher probability that the animal is defecating; determining whether the human changes his perspective relative to the animal; determining whether the animal is facing the human; determining whether the human moves toward the area of the paused animal; and determining whether the human demonstrates motions as bending/crouching.

In some examples, the user 116 may set detecting an animal on the lawn of the property as a lawn violation event. The user 116 may wish to prevent animals such as deer, rabbits, foxes, dogs, and cats from trespassing on the lawn of the property, and may set up an event to attempt to chase off the animals. The user 116 may set the event for detecting an animal to turning on one or more water sprinklers on the lawn. In other examples, the user 116 may set vandalism of the property, or removal (theft) of an item from the property as lawn violation actions. In these examples, the monitoring server 114 may use different video analytics criteria to determine when each of the activities are occurring. For example, when the lawn violation action is set to removal of an item from the property, the video analytics may include, determining a human is on the property, determining that the human is not identified as a resident or known visitor to with the property, determining whether the human has paused in front of an item, determining whether the human has made contact with the item, and determining whether the item is no longer present after the human has moved.

The user 116 may identify particular items on the lawn that should be monitored by the one or more cameras for theft. For example, the user may identify potted plants, figurines/statues, a garden hose, and solar lights as items that should be monitored for theft. The 116 may set the system to a training mode and provide confirmation of a theft action of each of the one or more identified items. For example, while the system is in training mode the user 116 may provide true or false responses based on reviewing video data of different actions caught on video. The user may review the video data and the determination made by the monitoring server 114 to respond whether the determination was true or false. The user may set the alert for detecting a theft as sounding an external alarm. In these examples, where a theft is determined, the monitoring server 114 may communicate one or more captured images of the violator to the relevant authorities. The monitoring server 114 may also store one or more images to detect repeat violators. The stored image data may also be communicated to the one or more neighboring homes 124.

For the example illustrated in FIG. 1, the one or more cameras 104 capture video data of the human 122 and the animal 120, and communicates the video data to the control unit 112. The control unit 112 performs the video analytics on the video data to determine that the human and the animal are owner and pet, the animal paused in one spot for a period of time, the tail of the animal is lower than the nose of the animal, the slope of the tail of the animal is positive, the animal is facing the human, the human does not move toward the area of the paused animal, and the human does not demonstrate bending or crouching motions. Based on these determinations, the control unit 112 confirms that the animal 122 defecated on the lawn of the monitored property 102, and the human handler 122 did not collect the droppings 121. In some implementations, the video data received by the control unit 112 is communicated to the monitoring server 114, and the monitoring server 114 performs the video analytics on the data. In these implementations, the monitoring server 114 makes the determinations from the video data, and communicates the results to the control unit 112. The monitoring server 114 may receive trained data sets from one or more users from one or more neighboring homes 124. The one or more users from the one or more neighboring homes 124 may each configure their monitoring systems to detect lawn violations events. Each of the users may set their systems in a training mode where the user provides true or false responses based on reviewing video data of different actions in the captured video data. Each of the one or more users may review the video data and the determinations made by the monitoring server 114 to respond whether the determination was true or false. The trained data sets may be used to improve the algorithms to increase the accuracy of the determinations. Receiving user feedback from one or more users from one or more neighboring homes 124 while in the training mode allows the monitoring server 114 to continuously strengthen the determinations made. In other implementations, the one or more cameras 104 may perform the video analytics.

As described earlier, the user sets lawn violation actions and the corresponding alarm condition for each violation action through a monitoring system application. The monitoring server 114 may be the backend server that manages the monitoring system application, and the user's preferences may be stored in memory at the monitoring server 114. The stored user preferences may be communicated to the control unit 112. The control unit 112 may simulate an alert event based on the determination that the human 122 does not collect the animal droppings 121. For the example illustrated in FIG. 1, the control unit 112 prompts a speaker located at the exterior of the property 102 to generate a voice command instructing the human to pick up the droppings. The user 116 may also receive an alert from the monitoring server 114 indicating that a lawn violation occurred. The alert may include a description of the event, and the corresponding action taken by the control unit 112. In some examples, the alert may include an image of the human 122 and the animal 120. The PIR sensor within the one or more cameras 104 may confirm the animal 120 defecated on the lawn by detecting an additional object 121 within the FOV 106. The PIR sensor detects that object 121 is radiating heat, and communicates this data to the control unit 112. In some implementations, the monitoring server 114 may dispatch a drone to collect the droppings 121 left behind after a lawn violation event.

In some implementations, the monitoring server 114 may store one or more images of the handler 122 and the animal 120. The monitoring server 114 may use the stored images to determine the physical characteristics of both the human 122 and the animal 120. The monitoring server 114 may generate a tag to identify the human 122 and animal 121 combination based on the identified physical characteristics such as, human height, human size, animal size, color of pet, and any other suitable characteristic. The one or more images, and the tagged data may be used to generate a list of one or more humans and pets that have caused lawn violation actions. For example, the homeowners association in a particular neighborhood may maintain a database that includes the one or more identified pets and humans that have caused lawn violations to homes in the neighborhood. The monitoring server 114 may use the tagged data and the image data to feed to an object recognition algorithm. The object recognition algorithm may be used, along with one or more other algorithms to determine whether future lawn violations were caused by the same human 122 and animal 120. In some implementations, the monitoring server 114 may detect humans and/or animals that repeatedly generate lawn violation events based on comparing captured images of a human and animal on the lawn to the stored images of past violators. The monitoring server 114 may receive one or more images of human/dog lawn violation perpetrators from one or more neighboring homes 124. The one or more images may be stored at a database associated with the monitoring server 114. The stored data may be used by the monitoring server 114 to proactively identify known lawn perpetrators before the perpetrators violate the lawn of another property. When a camera on a property detects a human and a pet on the lawn, their images may be compared against the stored images. When a match is identified, the human/animal pair is a known lawn violator, the monitoring server 114 may communicate to the control unit at the property to initiate a response action. The response action may be initiated to attempt to prevent a lawn violation action from occurring. For example, the control unit may prompt an exterior siren to be sounded in attempt to chase the animal away.

In some implementations, the property 102 may be equipped with a RF tag reader and may identify an animal based on reading the RF tag implanted in the animal. The RF reader may read the RF tag on the animal and may identity the animal to which it is implanted. In these implementations, the RF tag information is communicated to the monitoring server 114. The monitoring server 114 may store the RF tag information of a known violator to use to deter other violation events when an RF reader at a property identifies a known violator on the property 102 or on the lawn of a neighboring property 124.

In some implementations, where the monitoring system controls an in-home security system, the armed status of the security system may affect the response action taken to a lawn violation action. When the in-home security system is in an armed away state, the system may take this as an indication that the homeowners are not at the monitoring property. In some implementations, the one or more sensors 110 and one or more cameras 104 at the property 102 may be used to confirm whether the property 102 is unoccupied. The system may sound an audible alarm when the system detects a dog defecated on the lawn of the monitored property 102 and the human handler did not collect the droppings. When the in-home security system is unarmed, the system may take this an indication that the homeowners are at the property 102. The one or more sensors 110 and one or more cameras 104 at the property 102 may be used to confirm that is property 102 is occupied. Based on the system confirming that the house is occupied, and detecting that a dog defecated and the human handler did not collect the droppings, the system may sound an audible chime within the property 102. This chime notifies the user 116 to a lawn violation event, and the user 116 may choose to go outside to tell the human handler to collect the droppings. In some implementations, the system may send a notification to the user's mobile device 118. The notification may include a captured image of the dog and its human handler.

Figure 2:
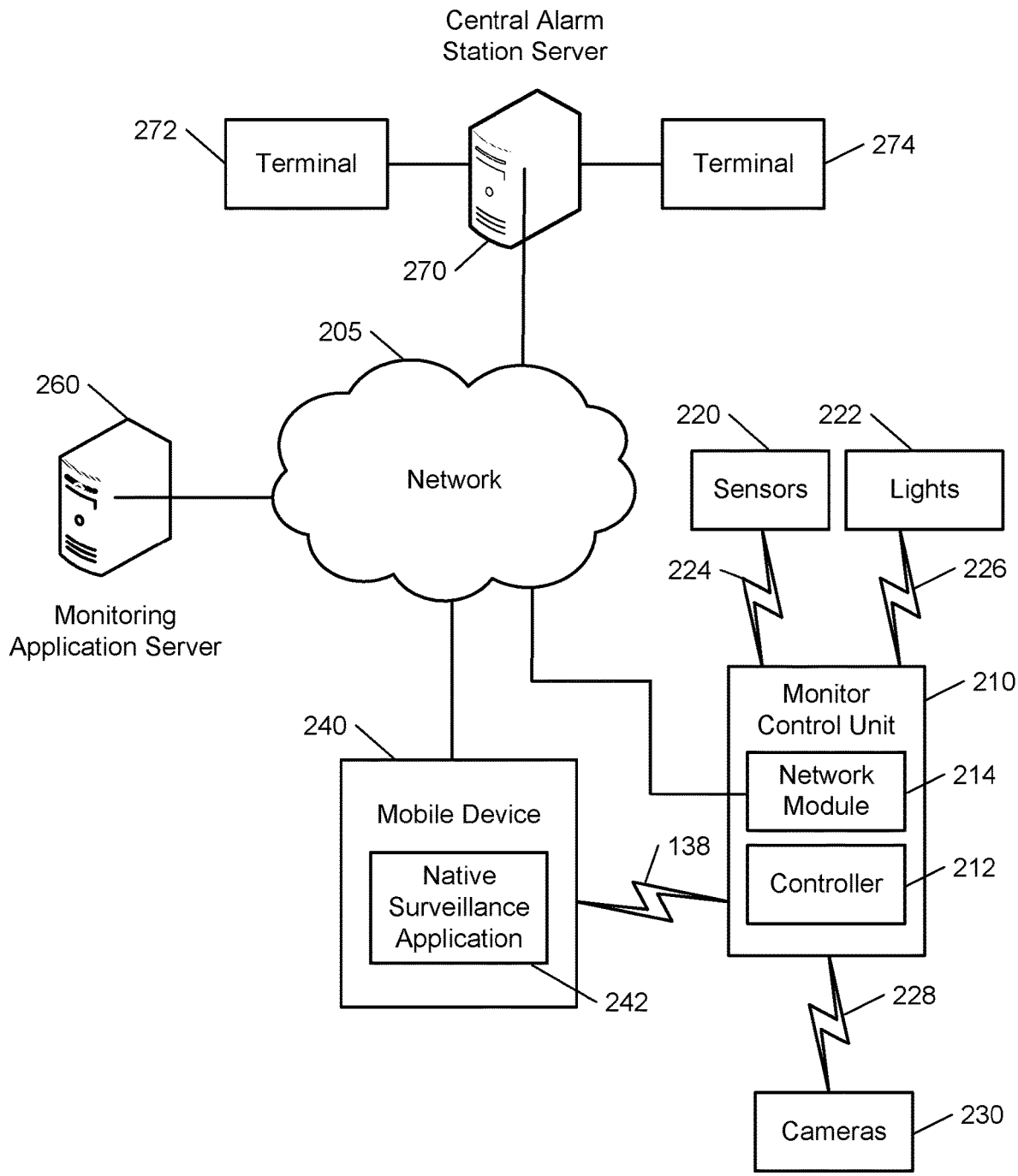
FIG. 2 illustrates an example of a monitoring system integrated with one or more cameras.

FIG. 2 illustrates an example of a system 200 configured to monitor a property. The system 200 includes a network 205, a monitoring system control unit 210, one or more user devices 240, and a monitoring application server 260. The network 205 facilitates communications between the monitoring system control unit 210, the one or more user devices 240, and the monitoring application server 260. The network 205 is configured to enable exchange of electronic communications between devices connected to the network 205. For example, the network 205 may be configured to enable exchange of electronic communications between the monitoring system control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system may include one or more cameras 230. The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The cameras may be triggered by several different types of techniques. For instance, a Passive Infra Red (PIR) motion sensor may be built into the cameras and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The sensors 220, the lights 222, and the cameras 230 communicate with the controller 212 over communication links 224, 226, and 228. The communication links 224, 226, and 228 may be a wired or wireless data pathway configured to transmit signals from the sensors 220, the touchless doorbell device 222, and the cameras 230 to the controller 212. The communication link 224, 226, and 228 228 may include a local network, such as, 802.11 "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a monitoring application 242. The monitoring application 242 refers to a software/firmware program running on the corresponding mobile device that enables the user interface and features described throughout. The user device 240 may load or install the monitoring application 242 based on data received over a network or data received from local media. The monitoring application 242 runs on mobile devices platforms, such as iPhone, iPod touch, Blackberry, Google Android, Windows Mobile, etc. The monitoring application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication. Other arrangements and distribution of processing is possible and contemplated within the present disclosure.

Figure 3:
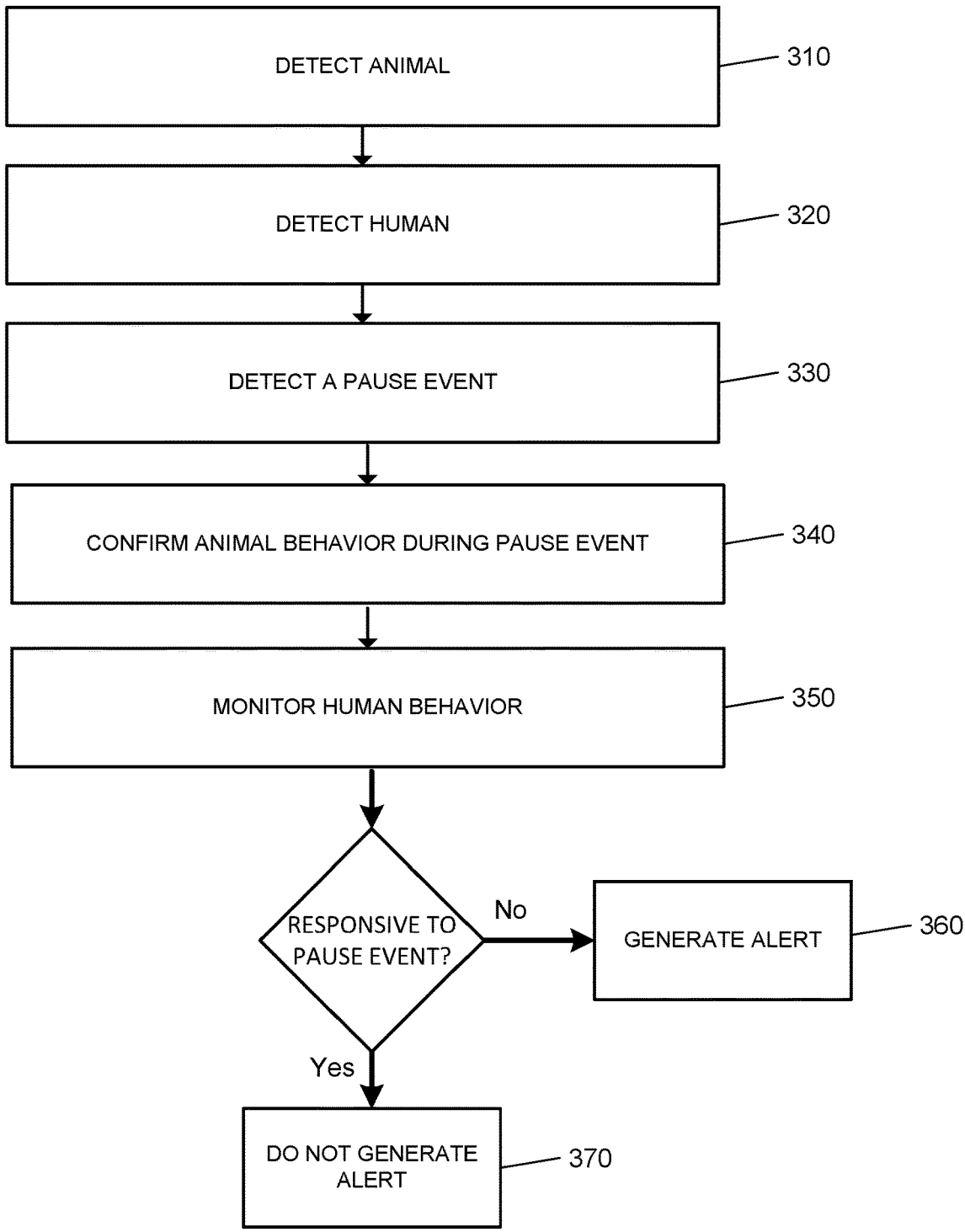
FIG. 3 is a flow chart of an example process for determining when to send an alert notification to a user.

FIG. 3 illustrates an example process 300 for sending an alert notification to a user. The one or more cameras 104 detect an animal on the lawn of the monitored property 102 (310). The one or more cameras 104 may be mounted to an external wall of the monitored property 102, and each of the one or more cameras 104 may be configured to pan and or tilt to change its' field of view. Each of the one or more cameras 104 include a PIR sensor that detects the heat radiated off the animal 120. Each of the one or more cameras 104 also include a low power light sensitive sensor that can distinguish between a human form and an animal form. Based on the variations in light intensity reaching the light sensitive sensor, the camera is able to determine the shape of the object is that of an animal. The control unit 112 detects a human 122 on the lawn of the monitored property 102 (320). Based on the variations in light intensity reaching the light sensitive sensor, the camera is able to determine the shape of the object is that of a human. The video data received from the one or more cameras 104 that detect the animal 120 and human 122 may be communicated to the control unit 112. In some implementations, the control unit 112 performs video analytics on the received data. In other implementations the video data is communicated to the monitoring server 114 and the video analytics are performed at the monitoring server 114. In yet another implementations, the one or more cameras 104 perform the video analytics on the captured video data. The video data may be interpreted to determine whether the human is located near the animal. For example, the human is determined to be near the animal 120 when the human is within twenty feet of the animal. The video analytics may be interpreted to determine whether there is a physical connection between the human 122 and the animal 120. Based on determining that there is a physical connection between the human 122 and the animal 120, the system confirms that the human 122 is the owner of the animal 120. The system may also confirm the animal 120 is a dog based on determining the animal is physically connected to the human 122.

The control unit detects a pause event (330). The video data may be interpreted to determine that the animal 120 and or human 122 has paused in a particular location for a given period of time. The monitoring server 114 may over time may be able to distinguish between urinating events and defecating events based on the period of time of the pause. The control unit 112 confirms animal behavior during the pause event (340). The video analytics performed on the video data may determine whether the animal's nose is lower than the base of the tail. Based on confirming the animal is a dog, one or more algorithms are used to identify the tail and the nose of the dog. The one or more algorithms may determine the location of eyes and confirm that the head is the end of animal close to the eyes. The monitoring server 114 confirms the dog is defecating or sitting when the tail of the dog is lower than the nose. The video analytics may determine whether the slope of the dog's tail is positive, where the tail slopes in an upward angle toward the sky, or whether the slope of the dog's tail is neutral, where the tail is parallel to the ground. Based on the monitoring server 114 confirming the dog's tail is either positive or neutral, the system confirms there is an increased indication that the dog is defecating.

The monitoring server 114 monitors the human 122 behavior in response to the animal 120 behavior (350). The monitoring server 114 continues to receive video data from the control unit 112, and performs video analytics to determine whether the human 122 collected the dog droppings 121. The video data may be interpreted based on determining the human pauses as the same time as the animal. Based on the monitoring server 114 confirming the human pauses with the animal, the system confirms there is an indication that the dog is defecating. The video data is also interpreted to determine whether the human changes perspective as both the human and dog are paused indicating that the human is looking away as the dog defecates. The monitoring server 114 may make the determination that a defecation event occurred when at least one or more criteria for indicating that the dog has defecated are met. In some implementations, the monitoring server 114 may only make a determination that a defecation event occurred when each of the one or more criteria are met. In other implementations, the monitoring server may make a determination that a defection event occurred when a subset of the criteria is met.

After the monitoring sever 114 determines that a defecation event has occurred, the server continues to receive video data to determine whether the human has collected the dog droppings. The video data may be analyzed to determine whether the human 122 pauses in the location that the dog 120 paused, and whether the human 122 demonstrated a crouching or bending motion. The monitoring server 114 generates an alert event based on determining the human 122 does not pause and crouch or bend to collect the animal droppings (360). The monitoring server 114 communicates the alert to the control unit 112, and prompts the control unit 112 to simulate the alert event. The user 116 may select the event that should occur based on determining that the human 122 does not collect the dog droppings. For example, the user 116 may select to have an exterior siren sounded. In other examples, the user 116 may select to have an exterior speaker issue a voice command instructing the human 122 to collect the droppings. The alert event may be an event selected by the user 116. In examples where the monitoring server 114 determines that the human 122 paused and demonstrated a crouching/bending motion, the monitoring server does not generate an alert (370).

Figure 4:
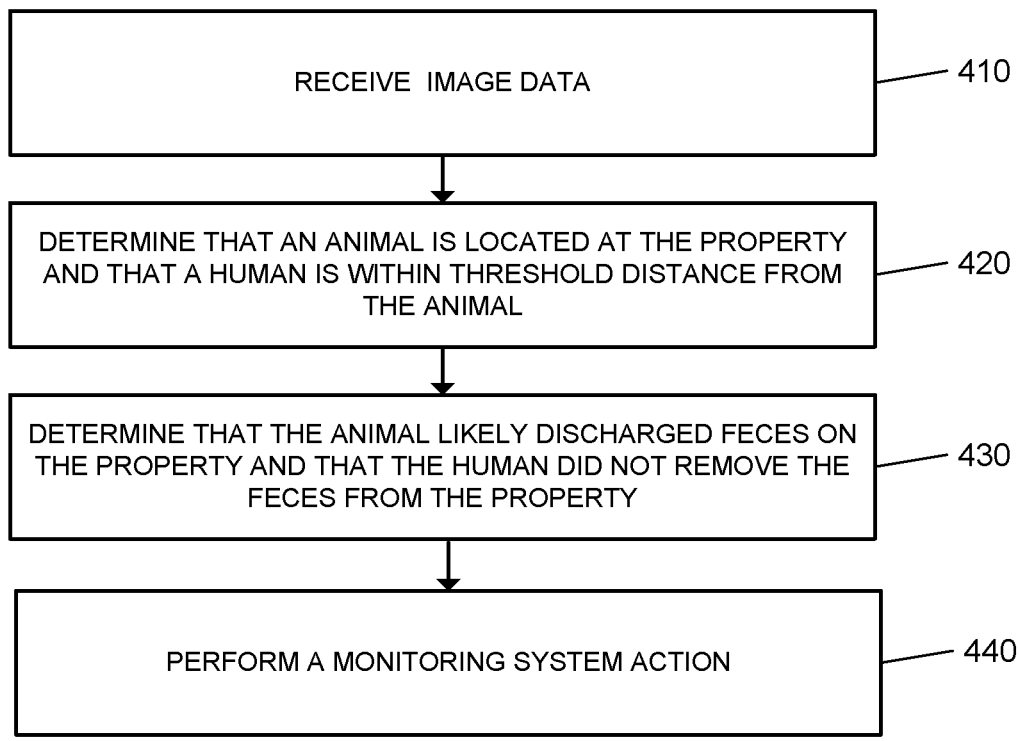
FIG. 4 is a flow chart of an example process for performing a monitoring system action.

FIG. 4 illustrates an example process 400 for performing a monitoring system action. The monitor control unit 112 receives first image data from the camera (410). The monitored property 102 may be equipped with one or more camera 104 that are located at an exterior of the property and that are configured to capture images of the lawn of the monitored property 102. In some examples, the one or more cameras 104 may include a passive infrared sensor (PIR) that is configured to detect the heat radiated off of a living object. In these examples, when a human or an animal moves within the field of view (FOV) of at least one of the one or more cameras 104, the PIR sensor detects the heat radiated off the human and or the animal. The one or more cameras 104 begin to capture of image data in response to detecting that a human or an animal is within the FOV of the camera. The one or more cameras 104 communicate the one or more captured images to the monitor control unit 112.

The monitor control unit determines that an animal is located at the property and that a human is within a threshold distance of the animal (420). In some examples, the one or more cameras 104 include a low power light sensitive sensor. The low power light sensor may be configured to collimate light such that an adequate number of regions of the FOV are collimated onto a sufficient number of regions on the sensor, and may be configured to assess the amount of light striking the different regions of the sensor. In visual conditions other than total darkness, objects moving within the FOV of the one or more cameras 104 may cause changes in the amount of light reaching the light sensitive sensor. Based on the variations in the light intensity, the camera may determine when an object is moving. The monitor control unit 112 may be configured to receive data from the image data from the one or more cameras 106 to determine the shape of the detected object, and may determine whether the object is a human or animal based on the determined shape.

The monitor control unit 112 may determine the distance between the animal and the human. Based on comparing the distance between the animal and the human to a threshold, the monitor control unit 112 may determine that the human is within a threshold distance from the animal. In some implementations, the monitor control unit 112 may analyze the first image data to determine whether there is a physical connection between the animal and the human. For example, the monitor control unit 112 may utilize video analytic techniques to determine whether the animal is on a leash.

The monitor control unit determines that the animal likely discharged feces on the property and the human did not remove the feces from the property based on determining that the animal is located at the property and that a human is within the threshold distance from the animal (430). The monitor control unit 112 may utilize one or more algorithms and neural networks to analyze the image data received from the one or more cameras 104. The monitor control unit 112 may utilize trained neural networks to determine the actions of the animal and the human. The monitor control unit 112 may determine a confidence score that reflects whether the base of the tail of the animal is lower than the nose of the animal, indicating a likelihood that the animal is defecating. The monitor control unit 112 may determine a second confidence score that reflects whether the slope of the tail of the animal is positive or neutral, indicating that the animal is more likely defecating. The monitoring control unit 112 may determine a third confidence score that reflects a likelihood that the human within the vicinity of the animal bends over to collect the feces.

In some implementations, the monitoring control unit 112 may determine a confidence score that reflects whether the human paused simultaneously with the animal. The monitoring control unit may determine a confidence score that reflects whether the human changed perspective while pausing with the animal. The monitoring control unit 112 may further determine a confidence score that reflects a likelihood that the human bends over to collect the feces, or stoops to collect the feces. The monitoring control unit 112 may compare the one or more confidence scores to one or more confidence score thresholds to determine whether the animal defecated and whether the human collected the feces.

The resident user 116 of the monitored property 102 may identify the animal discharging feces on the property and the human not removing the feces as a prohibited action through a monitoring application. The resident 116 may log into a monitoring application that runs on the user device 118 to set the one or more actions that are prohibited actions, and may set a monitoring system action that should be performed in response to prohibited action. For example, the user 116 may indicate that a voice command instructing the human to collect the animal's feces be output in response to a human failing to collect. In some examples, a user 116 may set the presence of an animal as a prohibited action, and may set the monitoring system action to be performed as switching on one or more water sprinklers. In some examples, the user 116 may set the action to be taken as turning on one or more lights around the property, or emitting a silent whistle that bothers animals.

In some implementations, the one or more cameras 104 perform the video analytics. In other implementations, the one or more cameras 104 communicate the image data to the monitor control unit 112, and the monitor control unit performs the video analytics. In yet another implementation, the monitor control unit 112 communicates the image data to the monitoring server, and the monitoring server 114 performs the video analytics. The monitoring server 114 may be located remotely from the monitored property 102, and be in communication with one or more other control units from one or more other monitored properties. The monitoring server 114 may be configured to analyze the received image data to determine the actions of the animal and the human.

The monitor control unit performs a monitoring system action based on determining that the animal likely discharged feces on the property (440). In some examples, the monitor control unit 112 may sound an audible alarm at the property 102. In other examples, the monitor control unit 112 may output a voice command from a speaker instructing the human to collect the feces.

In some implementations, where the monitor control unit 112 determines that an animal is at the property and a human is not within a threshold distance from the animal, the monitoring control unit 112 may determine whether the animal is the pet that resides at the property 102. In these implementations, the monitoring control unit 112 compares the image of the animal to the one or more stored images of the property pet. Based on comparing the images, the monitor control unit 112 may determine that the animal is the property pet. The monitor control unit 112 may communicate a notification to the user device of the resident indicating that the pet discharged feces on lawn.

When the monitor control unit 112 determines that the animal on the property is not the property pet, the monitor control unit 112 may compare the images of the animal to one or more stored images. The one or more stored images may include images of animals that previously defecated on the lawn without the human collecting the feces. Based on determining that the image of the animal does not match any of the stored offenders, the monitor control unit 112 determines that the animal is a first time offender. The monitor control unit 112 stores the captured images of the animal. Based on determining that the image of the animal matches one of the store offenders, the monitor control unit 112 determines that the animal is a repeat offender. In these implementations, the monitor control unit 112 may perform a monitoring system action by switching on one or more lawn sprinklers.

In some implementations, the monitoring control unit 112 may compare one or more images of the human in the vicinity of the animal to one or more stored images. Based on the monitoring control unit 112 determining that the human in the vicinity of the animal is a known offender, that is a human that does not collect feces after its animal defecates on the property, the monitoring control unit 112 communicates a notification to the user device of the property. The notification may include the image of the human and the animal. In some implementations, where the notification may include any other appropriate identification information associated with the human. For example, the notification may include the address and the phone number of the human. In these implementations, the monitoring control unit 112 may receive address data and phone number data from the monitoring server 114. The monitoring server 114 may be in communication with one or more control units from surrounding homes and may include personal information associated with the residents of the surrounding home. For example, the monitoring server 114 may store an image of the resident, their address, and contact information.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, the monitoring system comprising:
    a camera that is configured to capture image data; and
    a monitor control unit that is configured to:
        receive, from the camera, image data;
        based on the image data, determine that an animal is located at the property, and that a human is within a threshold distance of the animal;
        based on determining that the animal is located at the property and that a human is within the threshold distance of the animal and based on the image data, determine that the animal discharged feces on the property and that the human did not remove the feces from the property by:
            determining that the animal lowered a base of a tail of the animal relative to a nose of the animal;
            determining that the human did not bend over after the animal lowered the base of the tail of the animal relative to the nose of the animal; and
            based on determining that the human did not bend over after the animal lowered the base of the tail of the animal relative to the nose of the animal, determining that the human did not remove the feces from the property, and
        based on determining that the animal discharged feces on the property and that the human did not remove the feces from the property, perform a monitoring system action.

2. The monitoring system of claim 1, wherein the camera includes the monitor control unit.

3. The monitoring system of claim 1, wherein the camera is remote to the monitor control unit.

4. The monitoring system of claim 1, wherein the monitor control unit is configured to perform a monitoring action by sounding an audible alarm, sounding an alarm audible to the animal, or activating a sprinkler at the property.

5. The monitoring system of claim 1, wherein the monitor control unit is configured to perform a monitoring action by outputting a voice command from a speaker instructing the human to collect the feces.

6. The monitoring system of claim 1, wherein the monitor control unit is configured to:
    receive, from the camera, additional image data;
    based on the additional image data, determine that an additional animal is located at the property, and that an additional human is not within the threshold distance of the additional animal;
    based on determining that the additional animal is located at the property and that the additional human is not within the threshold distance of the additional animal and based on the additional image data, determine that additional animal discharged feces on the property;
    compare the additional image data to a stored image of a pet that lives at the property;
    based on comparing the additional image to the stored image of the pet that lives at the property, determine that the additional animal is the pet that lives at the property; and
    based on determining that the additional animal is the pet that lives at the property and based on determining that the additional animal discharged feces on the property, communicate a notification to a user device of a resident of the property.

7. The monitoring system of claim 1, wherein the monitor control unit is configured to:
    compare the image data to stored images of animals that have previously discharged, on the property, feces that was not removed;
    based on comparing the image data to the stored images of animals that have discharged, on the property, feces that was not removed, determine that the animal has not previously discharged, on the property, feces that was not removed; and
    based on determining that the animal has not previously discharged, on the property, feces that was not removed, store the image data as an image associated with the animal and data indicating that the animal has discharged, on the property, feces that was not removed.

8. The monitoring system of claim 1, wherein the monitor control unit is configured to:
   receive, from a server, images of animals that have previously discharged, on properties in a vicinity of the property, feces that was not removed;
   comparing the image data to the images of animals that have previously discharged, on properties in the vicinity of the property, feces that was not removed;
   based on comparing the image data to the images of animals that have previously discharged, on the properties in the vicinity of the property, feces that was not removed, determine that the animal has not previously discharged, on the properties in the vicinity of the property, feces that was not removed; and
   based on determining that the animal has not previously discharged, on the properties in the vicinity of the property, feces that was not removed, provide, to the server, the image data as an image associated with the animal and data indicating that the animal has discharged, on the property, feces that was not removed.

9. The monitoring system of claim 1, wherein the monitor control unit is configured to:
   receive, from the camera, additional image data;
   based on the additional image data, determine that an additional animal is located at the property;
   compare additional image data to locally or remotely stored images of animals that have previously discharged, on the property or a nearby property, feces that was not removed;
   based on comparing the additional image data to the locally or remotely stored images of animals that have previously discharged, on the property or the nearby property, feces that was not removed, determine that the additional animal has previously discharged, on the property or the nearby property, feces that was not removed; and
   based on determining that the additional animal has previously discharged, on the property or the nearby property, feces that was not removed, switch on one or more lawn sprinklers in a vicinity of the additional animal.

10. The monitoring system of claim 1, wherein the monitor control unit is further configured to:
    receive, from the camera, additional image data;
    based on the additional image data, determine that an additional animal is located at the property, and that an additional human is within a threshold distance of the additional animal;
    compare the additional image data to stored images of humans who have not removed, from the property, feces discharged by an animal accompanying a respective human;
    based on comparing the additional image data to the stored images of humans who have not removed, from the property, feces discharged by an animal accompanying the respective human, determine that the additional human is a human who has not removed, from the property, feces discharged by an animal accompanying the human; and
    based on determining that the additional human is a human who has not removed, from the property, feces discharged by an animal accompanying the human, communicate a notification to a user device of a resident of the property.

11. The monitoring system of claim 10, wherein the notification to the user device of the resident of the property includes an image of the human and the animal.

12. A monitoring system that is configured to monitor a property, the monitoring system comprising:
    a camera that is configured to capture image data; and
    a monitor control unit that is configured to:
      receive, from the camera, image data;
      based on the image data, determine that an animal is located at the property;
      based on determining that the animal is located at the property and based on the image data, determine that the animal discharged urine on the property and an elapsed time that the animal discharged urine on the property;
    based on the elapsed time that the animal discharged urine on the property, determine a period of time for a sprinkler to activate to dilute the urine below a threshold concentration; and
    activate the sprinkler that is located in a vicinity of the animal by activating the sprinkler for the period of time.

13. A computer implemented method comprising:
    receiving, by a monitoring system that is configured to monitor a property and from a camera, image data;
    based on the image data, determining, by the monitoring system, that an animal is located at the property, and that a human is within a threshold distance of the animal;
    based on determining that the animal is located at the property and that a human is within the threshold distance of the animal and based on the image data, determining, by the monitoring system, that the animal discharged feces on the property and that the human did not remove the feces from the property by:
      determining that the animal lowered a base of a tail of the animal relative to a nose of the animal;
      determining that the human did not bend over after the animal lowered the base of the tail of the animal relative to the nose of the animal; and
      based on determining that the human did not bend over after the animal lowered the base of the tail of the animal relative to the nose of the animal, determining that the human did not remove the feces from the property, and
    based on determining that the animal discharged feces on the property and that the human did not remove the feces from the property, performing, by the monitoring system, a monitoring system action.

14. The method of claim 13, comprising:
    receiving, from the camera and by the monitoring system, additional image data;
    based on the additional image data, determining, by the monitoring system, that an additional animal is located at the property, and that an additional human is not within the threshold distance of the additional animal;
    based on determining that the additional animal is located at the property and that the additional human is not within the threshold distance of the additional animal and based on the additional image data, determining, by the monitoring system, that the additional animal discharged feces on the property which was not removed by a human;

comparing, by the monitoring system, the additional image data to a stored image of a pet that lives at the property;

based on comparing the additional image to the stored image of the pet that lives at the property, determining, by the monitoring system, that the additional animal is the pet that lives at the property; and based on determining that the additional animal is the pet that lives at the property and based on determining that the additional animal discharged feces on the property, communicating, by the monitoring system, a notification to a user device of a resident of the property.

15. The method of claim 13, comprising:

comparing, by the monitoring system, the image data to stored images of animals that have previously discharged, on the property, feces that was not removed;

based on comparing the image data to the stored images of animals that have discharged, on the property, feces that was not removed, determining, by the monitoring system, that the animal has not previously discharged, on the property, feces that was not removed; and based on determining that the animal has not previously discharged, on the property, feces that was not removed, storing, by the monitoring system, the image data as an image associated with the animal and data indicating that the animal has discharged, on the property, feces that was not removed.

16. The method of claim 13, comprising:

receiving, from the camera and by the monitoring system, additional image data;

based on the additional image data, determining, by the monitoring system, that an additional animal is located at the property;

comparing, by the monitoring system, additional image data to locally or remotely stored images of animals that have previously discharged, on the property or a nearby property, feces that was not removed;

based on comparing the additional image data to the locally or remotely stored images of animals that have previously discharged, on the property or the nearby property, feces that was not removed, determining, by the monitoring system, that the additional animal has previously discharged, on the property or the nearby property, feces that was not removed; and based on determining that the additional animal has previously discharged, on the property, feces that was not removed, switching, by the monitoring system, on one or more lawn sprinklers in a vicinity of the additional animal.

17. The method of claim 13, comprising:

receiving, from the camera and by the monitoring system, image data;

based on the image data, determining, by the monitoring system, that an animal is located at the property, and that a human is within a threshold distance of the animal;

comparing the image data to stored images of humans who have not removed, from the property, feces discharged by an animal accompanying a respective human;

based on comparing the image data to the stored images of humans who have not removed, from the property, feces discharged by an animal accompanying the respective human, determining, by the monitoring system, that the human is a human who has not removed, from the property, feces discharged by an animal accompanying the human; and based on determining that the human is a human who has not removed, from the property, feces discharged by an animal accompanying the human, communicating, by monitoring system, a notification to a user device of a resident of the property.

18. The method of claim 17, wherein the notification to the user device of the resident of the property includes an image of the human and the animal.

19. A computer implemented method comprising:

receiving, by a monitoring system that is configured to monitor a property and from a camera, image data;

based on the image data, determining, by the monitoring system, that an animal is located at the property;

based on determining that the animal is located at the property and based on the image data, determining that the animal discharged urine on the property and an elapsed time that the animal discharged urine on the property;

based on the elapsed time that the animal discharged urine on the property, determining a period of time for a sprinkler to activate to dilute the urine below a threshold concentration; and activating the sprinkler that is located in a vicinity of the animal by activating the sprinkler for the period of time.

* * * * *